F. H. MASON, DEC'D.
M. H. MASON, C. A. BARTLESON & R. R. GILL, EXECUTORS.
VALVE.
APPLICATION FILED JAN. 24, 1910.
1,146,009.
Patented July 13, 1915.
2 SHEETS—SHEET 1.
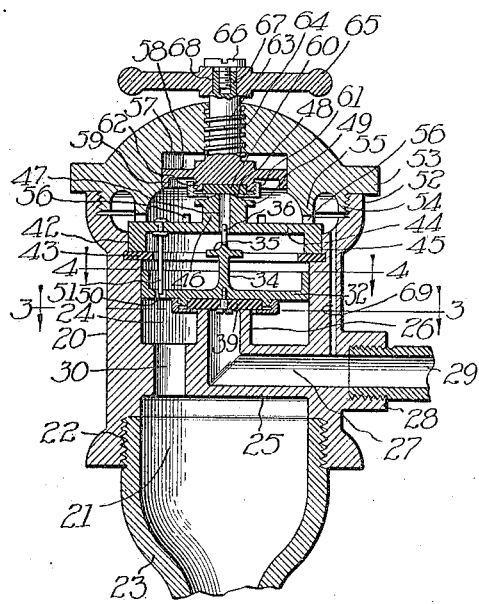
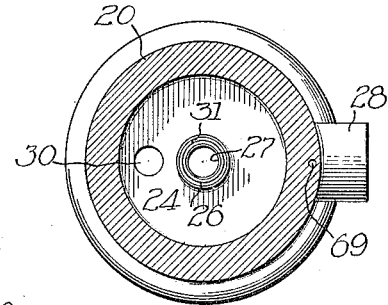
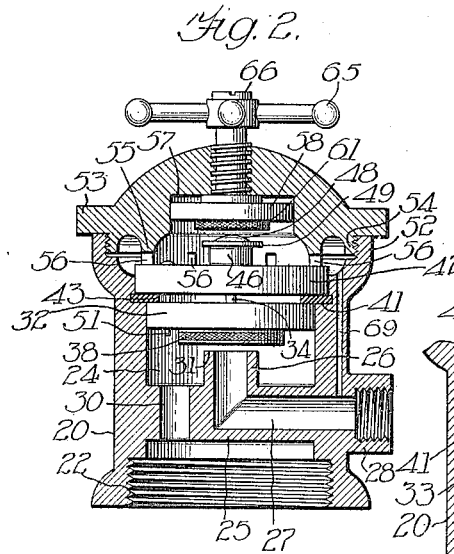
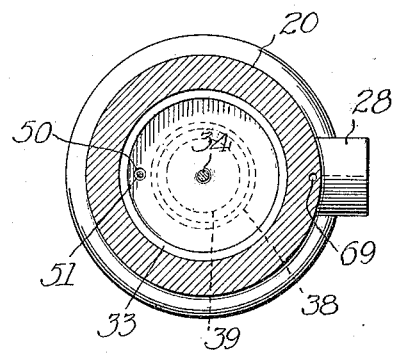
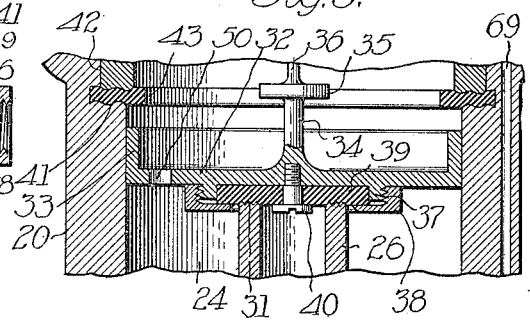
Witnesses:
Robert N. Weir
J. T. Simpson.
Inventor:
Frederic H. Mason
By Lucthicum Belt & Fuller
Attys F. H. MASON, DEC'D.
M. H. MASON, C. A. BARTLESON & R. R. GILL, EXECUTORS.
VALVE.
APPLICATION FILED JAN. 24, 1910.
1,146,009.
Patented July 13, 1915.
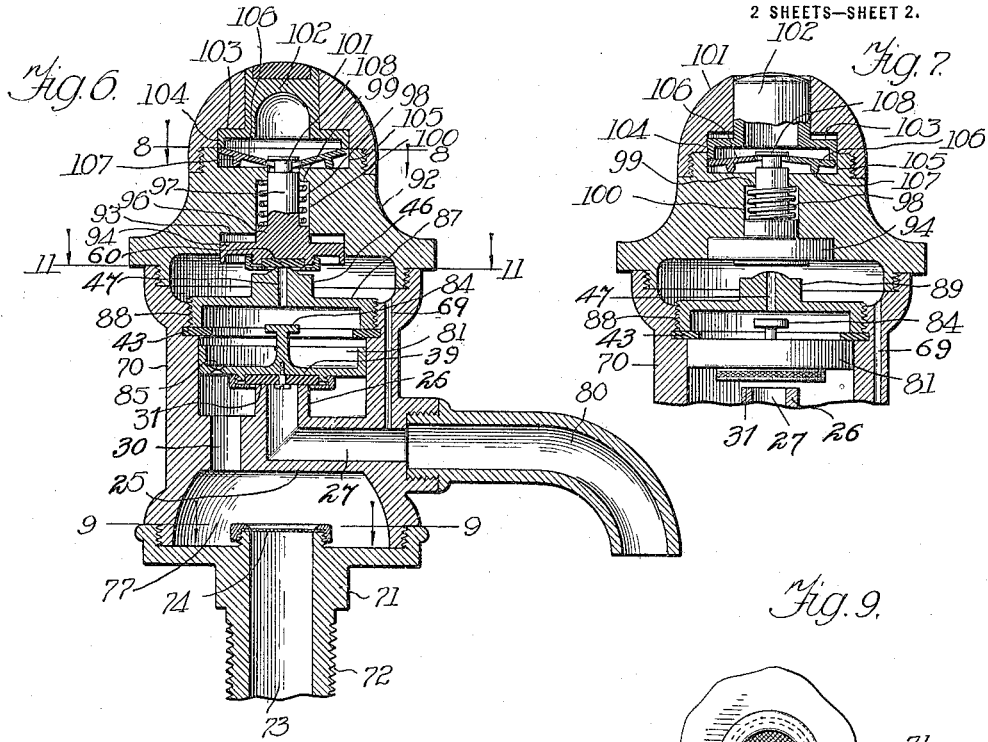
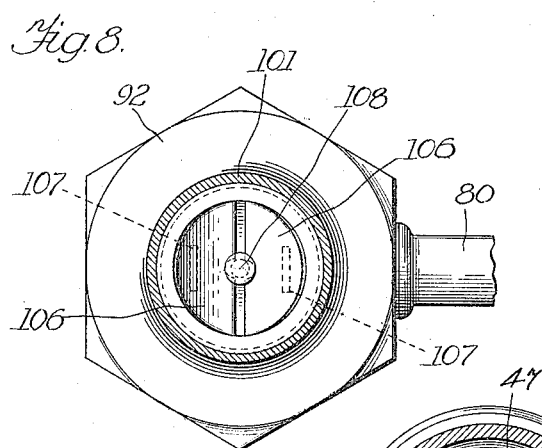
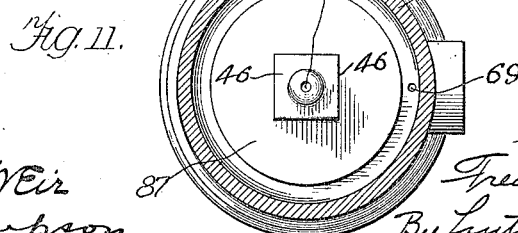
Witnesses:
Robert N. Weir
J. T. Simpson
Inventor:
Frederic H. Mason
By Luthucin Belt &
Fuller, Attys

UNITED STATES PATENT OFFICE.

FREDERIC H. MASON, OF SPOKANE, WASHINGTON; MOLLIE H. MASON, C. A. BARTLESON, AND ROY R. GILL EXECUTORS OF SAID FREDERIC H. MASON, DECEASED.

VALVE.

1,146,009.  Specification of Letters Patent.  Patented July 13, 1915.

Application filed January 24, 1910. Serial No. 539,735.

*To all whom it may concern:*

Be it known that I, FREDERIC H. MASON, a citizen of the United States, residing at Spokane, in the county of Spokane and State of Washington, have invented certain new and useful Improvements in Valves, of which the following is a specification.

My present invention relates to valves for controlling the flow of fluids under pressure, such for example as water, steam, air, gas, and the like.

The principal objects and purposes of the invention are, first, to provide a valve of this character which shall have few and simple working parts; which can be economically manufactured; and which will not be injured by extreme temperatures of fluids controlled, nor clogged or stopped by sediment or dirt contained in such fluids while passing through the valves; second, to provide a pressure counterpoise valve which is governed and operated entirely by means of the pressure of the fluid which it confines and controls, without the employment of a restricted by-pass or springs, whereby a valve embodying my invention is so nicely balanced that the discharge of the controlled fluid can be regulated at the will of the operator, and which will close completely without any leakage and solely by the pressure of the fluid, the flow of which the valve governs; third, to produce a valve of this kind which will operate satisfactorily even though the fluid pressure is very low, and which will close quietly and quickly, or quietly and slowly as adjusted, without the occurrence of any chattering or back-hammering, even though the fluid pressure is comparatively high, and without the employment of a supplementary air chamber.

A further object of the invention is to construct a valve in such a manner that it can be easily and quickly opened by a slight turn of the operating handle in one direction, and quickly closed by a slight turn of such handle in the reverse direction.

A valve having these features can, as is obvious, be used in many places as an emergency valve to stop motors of various kinds when accidents happen, or can be used to shut off escaping steam at the boilers when steam pipes burst, by being connected electrically or otherwise so that by pushing a button at any distance from the motor or boiler the valve operating handle will be turned and the valve closed. It may be noted also that a valve having the characteristics and features set forth in detail hereinafter may be worked or operated satisfactorily in substantially any position.

In one embodiment of the invention the above mentioned objects may be accomplished by providing a valve casing wherein the valve chamber is separated from the inlet chamber by a partition, a portion of which is extended or projected into the valve chamber and forming in such partition and the extended or projected portion thereof a discharge channel connecting the valve chamber with the exterior of the casing. In such an embodiment of this invention the valve has an inlet passage or opening extended through the partition at one side of the projection or extension mentioned above, such inlet passage, therefore, being in communication with the interior of the valve chamber, as will be readily understood. The valve proper in an appliance of this kind is preferably of the counterpoise form and is operated by varying or balancing and unbalancing the pressures on the opposite sides thereof, such valve being adapted to open and close the discharge channel or passage mentioned above, and thereby establish and break communication between the inlet and outlet. In order to increase and reduce the fluid pressure on the side of the valve opposite the inlet and outlet passages, the valve casing is preferably formed with a drainage channel between which and such side of the valve an auxiliary or supplemental valve is employed, this latter valve being operated in any approved manner, preferably by manual manipulation of suitable parts, such, for example, as a rotary handle or sliding push button. In some embodiments of the invention this auxiliary or supplemental valve port is formed in an intermediate member interposed between the main valve and the drainage channel, the valve coöperating with the port through such intermediate member being on the drainage channel side thereof, so that it is closed against the pressure operating on one side of the main valve. Because of this arrangement of parts the opening and closing of this auxiliary valve can be nicely regulated so as to adjust the stream passing through the main outlet. This is brought about owing to the fact that the movement of the main valve corresponds substantially to the movement of this auxiliary valve, thereby giving the operator complete control of the flow of the fluid through the discharge channel referred to.

Whereas I have hereinafter described, with some considerable degree of exactness and minuteness, preferred embodiments of the invention, which I have illustrated in detail in the drawings, and their modes of operation, it is not to be assumed that this invention, especially as set forth in the broader claims, is limited to these particular constructions and embodiments, since they are susceptible of many modifications and changes without departure from the regulating principle involved and without departing from the heart and substance of the invention. Such changes and modifications of various kinds will be apparent to persons skilled in this art as soon as the theory of construction and operation of the embodiments herein set forth is fully understood.

In the accompanying drawings, which form a part of this specification, and throughout the various views illustrating the same structure like reference characters refer to the same parts, Figure 1 is a central vertical section through a valve embodying the invention, showing the valve closed; Fig. 2 is a similar view showing the relation of the parts when the valve is open; Fig. 3 is a horizontal cross-section on line 3—3 of Fig. 1, as the parts are viewed in the direction indicated by the arrows; Fig. 4 is a similar section on line 4—4 of Fig. 1; Fig. 5 is a fragmentary cross-section on an enlarged scale showing more in detail the construction of the main valve and the fluid-tight connection between the intermediate member and the valve casing; Fig. 6 is a central vertical section of another embodiment of the invention showing a valve of the self-closing type with the main valve thereof in closed position; Fig. 7 is a fragmentary section similar to Fig. 6 showing the relation of the parts of the structure when the valve is open; Fig. 8 is a horizontal cross-section on line 8—8 of Fig. 6; Fig. 9 is a similar fragmentary section on line 9—9 of Fig. 6, showing the strainer; Fig. 10 is a perspective view of the under side of one of the wings or segments used in the type of valve shown in Fig. 6 for operating the auxiliary or secondary valve; and Fig. 11 is a horizontal cross-section on line 11—11 of Fig. 6, the parts being viewed in the direction indicated by the arrows.

Referring first to the form of valve shown in Figs. 1 to 5, inclusive, wherein the main valve may be adjusted to and held in any desired open position by suitable manipulation of the operating handle, it will be observed that the appliance includes a valve casing 20 having at one end an internally-threaded inlet chamber 21, with the threads 22 of which are adapted to coöperate those of a pipe or fixture 23. As is clearly indicated, this valve casing has a valve chamber 24 separated from the inlet chamber or compartment 21 by a partition or division wall 25, the latter having rising centrally from its top or inner surface a boss or extension 26, as is clearly illustrated in Figs. 1 and 2. Extended through such projection or boss 26 and the partition or division wall 25 I provide a right-angle discharge channel or passage 27, the outer end of such passage being in communication with a lateral apertured enlargement 28 at one side of the valve casing, and adapted to receive the end of a suitable discharge or outlet pipe 29 by the usual threaded connection. At one side of the boss or projection 26 the partition or division wall 25 is equipped with an inlet passage 30 of substantially the same area of cross-section as the discharge channel or outlet passage 27. The top end of the projection 26 constitutes a valve seat 31, and if desired the same may be annularly-grooved or roughened in any approved manner. The interior cavity or valve chamber 24 of the valve casing is of cylindrical form, and loosely mounted in such cavity or compartment I employ a cylindrical cup-shaped valve 32, having a peripheral upstanding annular guiding flange 33, it being understood that this valve is capable of free sliding or reciprocatory movement in the valve casing. Rising centrally from the top surface of such valve is a stem 34 carrying a lifting handle 35 above which is an upstanding pin 36 provided for a purpose hereinafter indicated. Depending from the bottom of the valve, and concentric with its axis is a flange 37 externally screw-threaded, the threads of such flange coöperating with those of a retaining member or housing ring 38 adapted to assist in confining a packing ring 39 made of suitable material and confined in the cavity or recess provided by flange 37, the inner edge of the retaining ring 38 underlying the outer portion of the ring 39, as I have clearly indicated in Fig. 5. The inner or central portion of this packing ring may, if desired, be securely held to the under side of the valve 32 by a screw 40 threaded into a suitable hole provided centrally of such valve. This sliding valve 32 is adapted to bear against the valve seat 31 through the interposed packing ring 39, whereby to close communication between the inlet passage 30 and the discharge channel or outlet passage 27, and it will be readily understood that when the valve 32 lifts, the fluid entering the valve casing through the inlet compartment 21 will pass through the inlet passage 30 and out through the valve casing through the discharge or outlet channel 27.

The interior of the casing 20 is shouldered at 41, the casing above such shoulder being of somewhat larger diameter at 42. A gasket 43 rests on the shoulder 41 and is securely held thereto by an inverted cup-shaped intermediate member 44 having a marginal depending flange 45, the lower edge of which bears on the gasket, as is clearly indicated in Fig. 1. This intermediate member in this particular embodiment of the invention has a snug fit within the enlarged portion 42 of the casing, and the flange 45 and gasket 43 are of such size that they project inwardly slightly beyond the shoulder 41, thereby acting as a cushion stop limiting the travel of sliding valve 32 in one direction. The top of the member 44, or outer face thereof, is supplied with an enlargement or projection 46 having a central valve port 47 extended therethrough and in alinement with the pin 36, which desirably projects partially thereinto in the closed position of the main valve. The outer or top face of the boss 48 is preferably of convex or curved shape, and in order to facilitate the removal of this intermediate member such boss may conveniently and desirably be provided with an outstanding flange 49, forming a handle by which such member can be readily lifted or removed.

The main valve 32 referred to above has a hole or port 50 extended therethrough at one side of the packing ring 39 and screw-threaded housing ring 38, and in register with such opening I employ a cleaning pin 51 secured to and depending from the intermediate member, all as is clearly shown in Fig. 1.

The top portion of the valve casing 52 is of still larger diameter, is internally screw-threaded, and has fitted thereto a bonnet or cover 53 having a bottom depending flange 54 externally screw-threaded and coöperating with the threads of the member 52, as is clearly shown. Inwardly of the flange 54 the bonnet or cover 53 has another depending rib or flange 55 notched along its lower edge at 56 and bearing on the top face of the intermediate member 44, acting to hold the later in proper coöperative relation with the gasket 43 so as to form a fluid-tight joint between such intermediate member and the valve casing. The parts of this appliance are so proportioned and constructed that when the under face of the bonnet or cover 53 engages the top of the valve casing, the lower edge of the flange 45 of the intermediate member 44 will be brought into proper bearing contact with the top surface of the gasket, the contact of the bonnet with the casing acting as a stop to prevent undue pressure on such gasket. The inner face of the bonnet or cover is cylindrically recessed at 57 for the accommodation and reception of a secondary or auxiliary valve 58 having a depending marginal flange 59 in sliding contact with the inner face of the recess or cavity, the valve also having on its under face a cylindrical piece of packing 60 held in place by a housing ring 61 applied to a threaded flange or rib 62 on the bottom of the valve. This construction is very similar to that of the main valve 32 and apparently needs no further detail description. Upstanding from this valve is a threaded stem 63, the ribbon threads of which coöperate with those of an aperture or hole 64 extending centrally through the bonnet or cap, the top end of this stem or shank having fixedly applied thereto a handle 65 held in place in any approved manner, as for instance by a screw 66. The upper end of the shank 63 has a square portion 67 fitting in a correspondingly-shaped hole 68 of the handle 65, the latter having a plurality of radiating arms, as is indicated in Fig. 2. In order to permit the discharge of the fluid passing through the valve port 47 when the valve 58 is raised, I provide a drainage channel 69 in the valve casing communicating at one end with the annular space or cavity between the flanges 54 and 55 of the bonnet, and connecting at its lower end with the discharge channel 27.

The operation of a valve of this character is substantially as follows: Assuming that the loose, freely-slidable, unattached valve 32 is in its lowermost position, as shown in Fig. 1, it will be apparent that it closes the mouth of the outlet or discharge passage 27 by bearing against and coöperating with the valve seat 31 at the top of the projection or boss 26. In this way it breaks the communication between the inlet passage 30 and the outlet channel 27, all as will be readily understood. Owing to the fact that the fluid entering the valve through the pipe 23 is permitted to fill the counterpressure chamber or compartment between the valve 32 and the intermediate member 44, because of the port or opening 50 through the former, it will be apparent that the total pressure on such side of the valve will be greater than that on the other side thereof, whereby the valve is firmly and securely held in closed position by this excess pressure on one side, owing to the greater area on the top side of the valve to which such fluid has access over the corresponding diminished area on the under side. It is to be understood, of course, that in the closed position of the valve 32 the auxiliary or secondary valve 58 closes the valve port 47 of the intermediate member 44. In order to open the main valve, whereby to establish communication between the inlet and the discharge passage, that is, to cause the lifting of the main valve, the operator turns the handle 65 to the left, thereby, because of the threaded connection between the stem 63 and the bonnet, moving the secondary valve 58 so as to raise its packing 60 away from the valve seat surrounding the port 47. Such opening of this auxiliary valve permits the discharge of the fluid in the counterpressure chamber between the main valve and intermediate member through the port 47, notches 56, and drainage channel 69, more rapidly than the fluid can pass through the restricted passage 50, and because of this action the fluid pressure on the back of the main valve 32 is reduced to such an extent as to be less than that on the bottom side of the valve. Consequently, the main valve automatically rises, moving its packing ring 39 away from the valve seat 31 and establishing connection or communication between the inlet passage 30 and the discharge channel 27. During this upward movement of the main valve, which is limited and restricted, as has been indicated above, by the gasket 43 and intermediate member 42, any sediment or dirt having a tendency to lodge in the port or aperture 50 is dislodged by means of the stationary pin 51 projecting therethrough, and the secondary valve port 47 is cleaned at the same time by the upward movement of pin 36 which projects thereinto. As long as this secondary or auxiliary valve is maintained open so as to permit the escape of the fluid from the top side of the main valve, thereby reducing the pressure thereon, the main valve will remain open, and the extent of such opening of the main valve will depend upon the extent of movement or turning of the handle 65. When it is desired to close the main valve and break the connection between the inlet and outlet, the handle 65 is turned to the right, thereby effecting closure of the secondary valve port 47 by the packing ring 60, the resulting action being an increased fluid pressure in the balance pressure compartment above the main valve, and as soon as such pressure exceeds that on the lower side of the main valve, the latter descends and closes the outlet opening. I desire to direct attention to the fact that because the valve seat 31 is inwardly of the valve casing beyond the inlet 30, the space between the top of the partition 25 and the valve forms a cushion compartment, the fluid in which assists in the steady and easy seating of the valve during its closing movement and in eliminating the noise or hammering. Experiment has demonstrated that the most favorable results are secured when the cross-section of the inlet passage 30 is substantially equal to that of the discharge or outlet channel 27, so that when the valve is descending the fluid is entering the chamber at substantially the same rate that it is leaving such chamber.

In Figs. 6 to 11, inclusive, I have indicated another embodiment of this invention wherein the actuating mechanism for the main valve takes the form of a push button, the valve being of the self-closing type and style. There are other features in this embodiment to which attention will be directed. In this case, as in the former instance, the valve includes a hollow valve casing 70, to the lower end of which is secured a centrally-apertured connection 71, to the lower threaded end 72 of which a pipe of any suitable character is intended to be applied. Over the opening 73 of such connection I position and fasten in any approved manner a screen 74 of the proper mesh for preventing the entrance of dirt and foreign matter to the interior of the valve casing. As in the previous instance, the valve casing has a transverse partition 25, an inlet passage 30, an inlet chamber 77, a boss 26 on the top of the partition, a discharge channel or passage 27, in this case in communication and connection with a spout 80. Within the valve casing I employ a slidable, freely-movable, cylindrical valve 81 unattached to any of the other parts of the appliance. A packing ring 39 is fastened to the under side of this valve and coöperates with the valve seat 31 on the top of boss 26. On its top this slidable valve has a handle 84 by which it may be readily removed from the casing when desired, and through the valve is a port or aperture 85, but in this case I employ no coöperating pin corresponding to the pin 51 to keep such port clean, the screen 74 performing such function in this embodiment of the invention. This type of valve also has a gasket 43 held in place by an intermediate member 87, the latter being screwed into place by means of threads 88 on its outer surface coöperating with similar threads on the inner portion of the casing. This gasket acts also as a cushion stop for the valve in its upward movement. In this device, as in the one described above, this intermediate member has a central boss 46 through which extends a valve port 47, this boss, as is shown in Fig. 11, being of angular form whereby to permit the application of a wrench thereto to facilitate the insertion or removal of such intermediate member and to effect the desired presusre on the gasket 43 against which its lower edge bears. Screwed into the top of the valve casing I employ a bonnet 92 centrally recessed on its inner face at 93 for the accomodation of a valve 94 carrying on its under face a packing 60 adapted to open and close the port 90. Extending outwardly or upwardly in the present instance from the valve 94 is a stem 96 having a part of reduced diameter characterized 97 and encircled by a spiral coil expansion spring 98 which bears at one end against the larger portion of the stem 96, and presses at its other end against the end wall 99 of a cavity 100 forming an extension of the recess 93 and housing this valve stem and ring. It will be readily understood that the action of this spring is to press this secondary or auxiliary valve downwardly or inwardly so as to close the port 47 through the intermediate member 87. A covering or cap 101 is applied in any approved manner to the bonnet 92, in the present instance being screwed thereon, such cover having a central hole accommodating a push button 102 having an enlarged inner end 103, the latter being equipped with a marginal depending circular flange 104. In a cavity 105 in the top of the bonnet 92 I employ a pair of segments or wings 106 each being substantially semi-circular in shape and having on its bottom surface a rib 107 bearing on the bottom of the recess 105 and constituting a fulcrum on which the wing or segment may be rocked. The top of the stem or reduced portion 97 of the secondary valve is undercut at 108 in the form of an annular groove, and in such groove the central portions of the pair of segments or wings fit, each being semi-circularly recessed at 109 for this purpose. As I have clearly shown in Fig. 6, these wings or segments are so positioned that their outer portions underlie the inwardly extended circular flange 104 of the push button 102. In the normal position of the elements of this construction, owing to the spring-pressed downward bias in the secondary valve 94, the inner edges of the wings or segments are held in their lowermost or innermost positions, as shown in Fig. 6, the outer edges of such wings or segments occupying their uppermost positions, as is clearly shown.

The operation of this valve is practically like that of the other one hereinbefore set forth in detail, with the exception of the manipulation of the secondary or auxiliary valve member, and this description of the operation will, therefore, be limited. It will be apparent that the push button 102 is normally projected upwardly or outwardly to its limit of movement, owing to the expansible action of the spiral spring 98 acting through the stem 97 and wings or segments, so that not only does the push button occupy such position but the secondary valve is normally closed, and such closure of course causes a normal closure of the main valve 81. In this particular style of device the push button is substantially flush with the outer surface of the cap when the valve is closed, but the device may be modified in this and other minor respects without affecting the invention or occasioning a departure from its substance. To open the main valve, that is, to create a communication between the inlet passage 30 and the discharge passage 27, the operator presses the push button downwardly or inwardly to a slight extent, thereby rocking the wings or segments 106 on their fulcrums 107 and lifting the secondary valve 94 against the action of its coöperating spring 98. Such movement of this secondary valve opens the port 47 and permits the escape of the fluid in the balance pressure compartment between the main valve and intermediate member, so that such escaping fluid may discharge through the drainage channel 69 formed in the side of the valve casing and connecting that portion of the casing above the intermediate member with the discharge channel 27 and connecting spout 80. As soon as the button 102 is released it automatically rises to its original position and the secondary valve automatically becomes seated over the port 47, due to the expansion of the spring 98, causing the closure of the main valve 81 over the discharge outlet, as in the previous instance. In this particular embodiment of the invention no cleaning pin has been indicated in connection with either of the ports or openings 85 and 47, the strainer 74 performing the function of preventing the clogging of such openings or passages with dirt or other foreign matter. As I have shown in Fig. 6, the port 85 is beveled or flared on opposite sides so as to reduce to a minimum any tendency of the same to become clogged or closed by any dirt or sediment which could possibly pass through the screen 74.

In the forms of appliances herein indicated, the port openings in the main valve and intermediate member need not be of minute dimensions, since practice has demonstrated that the devices operate satisfactorily when such openings are of fair size. In connection with these valves I desire to direct attention to the fact that the main valve operates to open and close the discharge passage, and that the inlet passage is at all times in communication with the pressure compartment above the main valve through the port or opening in the latter.

I claim:

1. In a device of the character described, a ported movable valve member having a cleaning pin thereon, and a ported stationary member having a cleaning pin thereon, the port and pin of one member being in respective alinement with the pin and port of the other member whereby relative movement of the parts serve to keep clean the ports, substantially as described.

2. In a device of the character described, a pair of coöperating relatively movable valve members each provided with a port and also with a pin, the pin of one member arranged in line with and adapted to enter and clean the port of the other member, substantially as described.

3. In a device of the character described, a pair of coöperating relatively movable valve members, the movable member and the stationary member each provided with a port and also with a pin, the pin of one member adapted to enter and clean the port of the other member, substantially as described.

4. In a device of the character described, the combination of a valve casing, a freely slidable ported valve therein, a gasket resting on an inner shoulder of said casing, and an intermediate member holding said gasket in position, and provided with a pin in alinement with the valve port, said gasket and member being in the path of travel of said valve and acting as a stop therefor during its movement in one direction, and the pin entering and cleaning the valve port during such movement, substantially as described.

5. In a device of the character described, the combination of an apertured movable valve having a cleaning pin thereon, a member having a valve port therethrough in alinement with the pin of said valve, whereby movement of the latter cleans said valve port by means of said pin, and a second pin on said member in alinement with the aperture of said valve and adapted upon movement of said valve to dislodge any accumulation in said aperture, substantially as described.

6. In a device of the character described, the combination of a valve casing having an inlet opening thereto and an outlet opening therefrom, a valve seat around said outlet opening, an intermediate member in said casing forming between itself, said casing and the inlet and outlet openings in said casing, a counterpressure valve compartment, said intermediate member having a valve port therethrough, a ported freely-slidable valve in said counterpressure valve compartment adapted to open and close said outlet opening whereby to establish and break communication between said inlet and outlet openings, said inlet and outlet openings being on the same side of said valve, and a secondary valve adapted to open and close the valve port of said intermediate member and located outside of said counterpressure valve compartment, whereby the opening and closing of said secondary valve causes a corresponding movement of the valve controlling said outlet, said slidable valve having a central handle for convenience in inserting and removing, said handle having an extension cleaning pin adapted to reciprocate in the port through said intermediate member as said slidable valve moves, and a second depending cleaning pin attached to said intermediate member adapted to reciprocate through the port in said slidable valve as said valve moves, all substantially as described.

7. In a device of the character described, the combination of a valve casing having an inlet and outlet, valve seat around outlet, a ported intermediate member in said casing located to form between itself and the outlet to the valve casing a counterpressure valve compartment, a cup-shaped valve freely movable in said counterpressure valve compartment and adapted by coöperation with said valve seat to open and close said outlet, said valve projecting beyond said outlet, said projection being apertured to permit at all times communication therethrough from the inlet to said counterpressure valve compartment, a gasket between said valve casing and said ported intermediate member to make a fluid tight joint and limit the travel of said cup-shaped valve, a bonnet for said valve casing equipped with connecting push button and secondary valve adapted to open the port in said intermediate member as said push button is depressed and close said port in the intermediate member when said push button is released, and a drainage channel in said valve casing connecting the interior space between the bonnet and the intermediate member with the outlet channel, all substantially as described.

8. In a device of the character described, the combination of a valve casing, a ported movable valve therein having a cleaning pin thereon, a member having a valve port therethrough in alinement with the pin on said valve, whereby movement of said valve cleans said valve port by means of said pin, and a secondary stationary pin in said valve casing in alinement with the port through said movable valve and adapted upon movement of the latter to dislodge any accumulation in the movable valve port, substantially as described.

FREDERIC H. MASON.

Witnesses:
WALTER M. FULLER,
GEO. C. DAVISON.

Copies of this patent may be obtained for five cents each, by addressing the "Commissioner of Patents, Washington, D. C."